United States Patent [19]

Hashimoto

[11] Patent Number: 4,489,429
[45] Date of Patent: Dec. 18, 1984

[54] PROGRAMMABLE CALCULATOR WITH VERBAL INDICATIONS OF STORED PROGRAMS

[75] Inventor: Shintaro Hashimoto, Ikoma, Japan

[73] Assignee: Sharp Kabushiki Kaisha, Osaka, Japan

[21] Appl. No.: 154,026

[22] Filed: May 28, 1980

[30] Foreign Application Priority Data

May 31, 1979 [JP] Japan .................. 54-74426[U]

[51] Int. Cl.³ .................. G10L 1/00; G06F 3/16
[52] U.S. Cl. .................. 381/51; 364/710
[58] Field of Search .................. 179/1 SM, 1 SG; 364/706, 715, 719, 710, 737, 200 MS File, 900 MS File; 371/17, 19

[56] References Cited

U.S. PATENT DOCUMENTS

| | | | |
|---|---|---|---|
| 3,102,165 | 8/1963 | Clapper | 179/1 SM |
| 4,085,443 | 4/1978 | Dubois et al. | 364/900 |
| 4,158,231 | 6/1979 | Oleander et al. | 364/200 |
| 4,176,394 | 11/1979 | Kaminski et al. | 364/200 |
| 4,179,584 | 12/1979 | Tanimoto et al. | 364/710 X |
| 4,185,170 | 1/1980 | Morino et al. | 364/710 X |
| 4,211,892 | 7/1980 | Tanimoto et al. | 179/1 SM X |

FOREIGN PATENT DOCUMENTS 2818370 11/1978 Fed. Rep. of Germany ... 179/1 SM

Primary Examiner—E. S. Kemeny
Attorney, Agent, or Firm—Birch, Stewart, Kolasch & Birch

[57] ABSTRACT

In order to provide a visual indication of the location of error in stored programs and allow easy and prompt correction for the error, a programmable calculator is provided with both a display device (preferably, a cathode ray tube) capable of displaying the contents of a plurality of consecutive program steps in a program memory at the same time and adapted for selectively displaying the plurality of the consecutive program steps in a stepwise manner and a sound or voice synthesizer for sequentially providing verbal indications of the contents of the consecutive program steps being visually displayed. It thus becomes possible to check a program just introduced by virtue of a verbal indication of the program derived from the verbal indication means and, in the event that an error has been found, immediately stop programming and correct readily and quickly for the error, since the visual display provides a series of consecutive program steps simultaneously to assist the operator in finding where the error is present in the program during a learning mode or thereafter.

3 Claims, 3 Drawing Figures

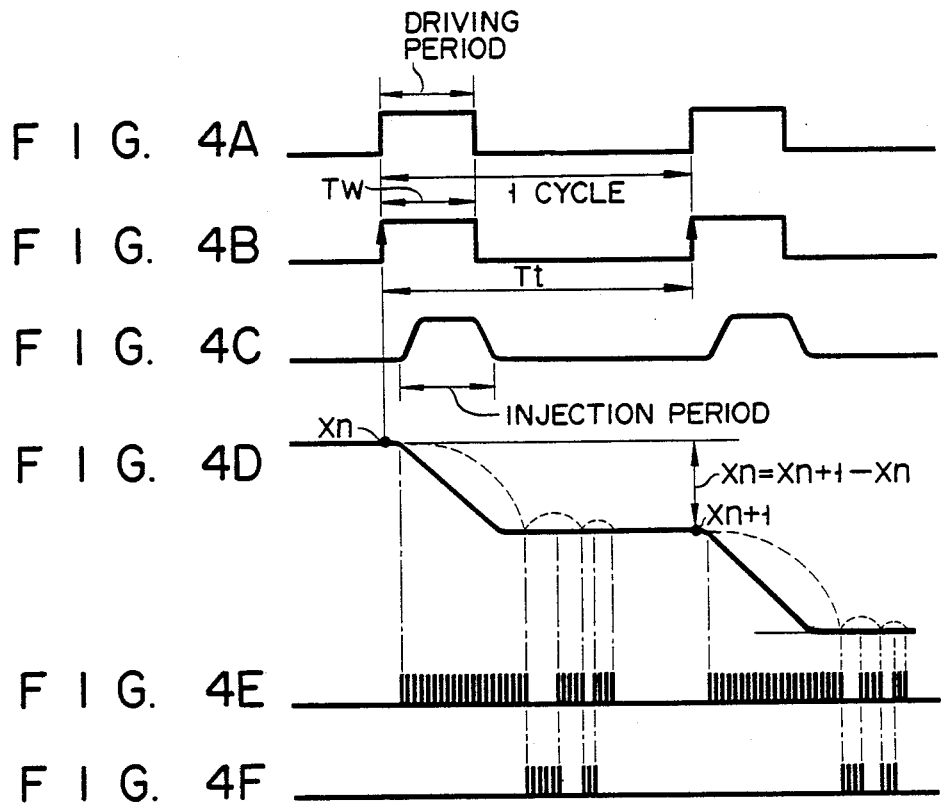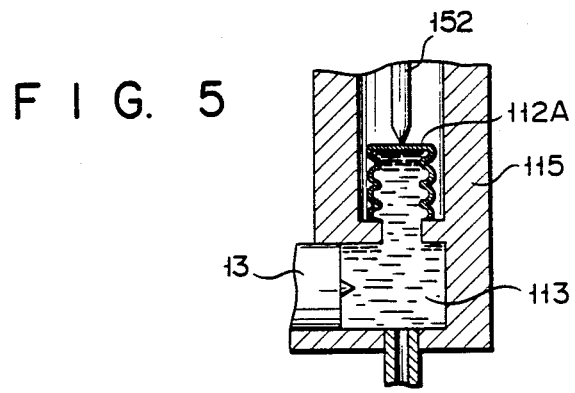

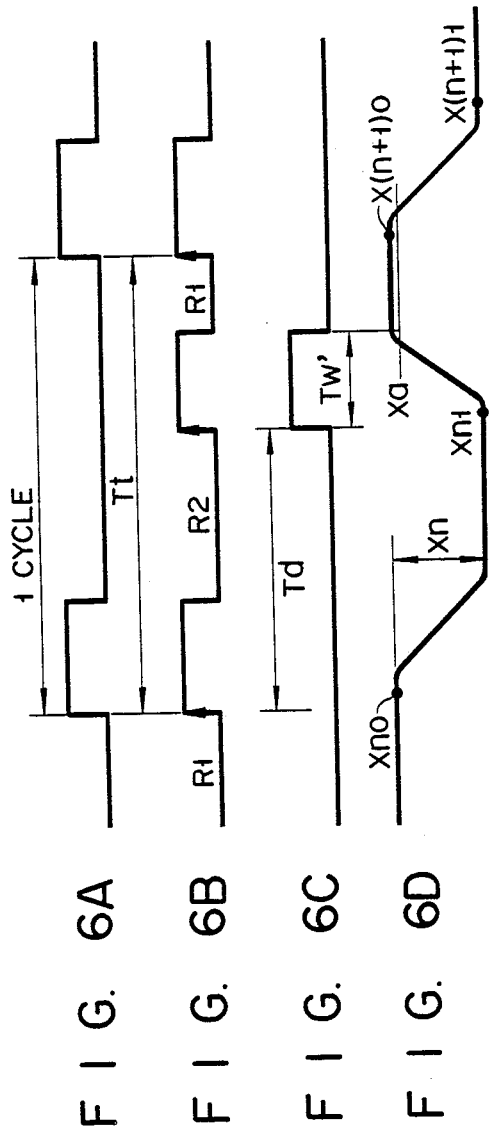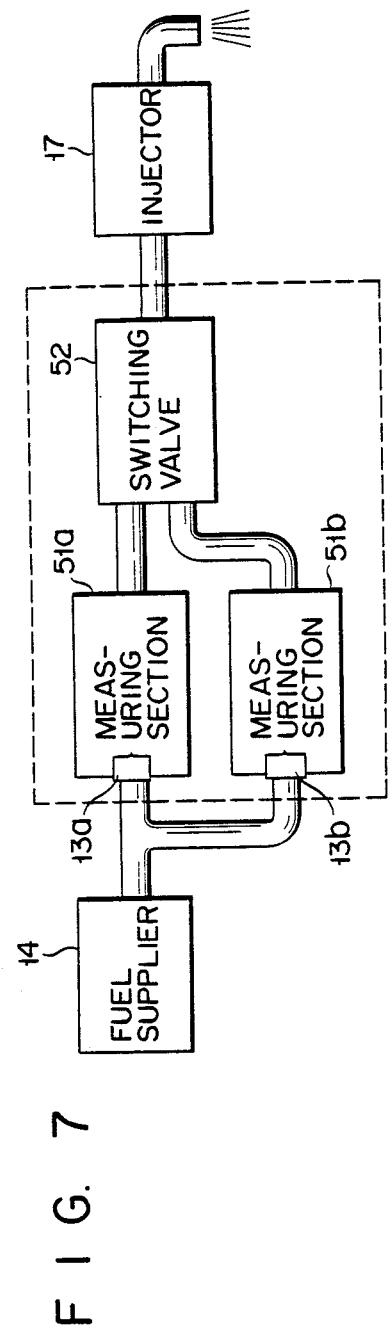

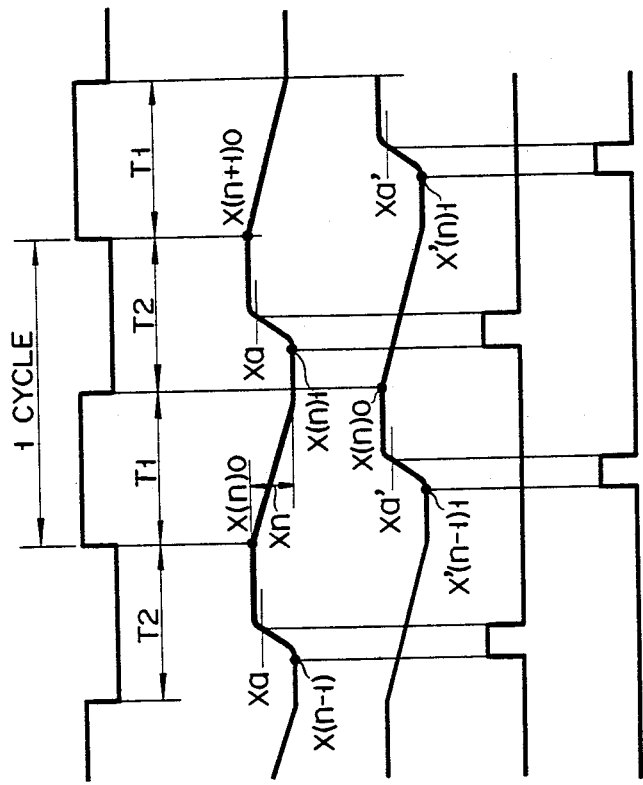

PROGRAMMABLE CALCULATOR WITH VERBAL INDICATIONS OF STORED PROGRAMS

BACKGROUND OF THE INVENTION

This invention relates to a programmable calculator, and more particularly to an improvement in the programmable calculator which provides easy and prompt check-up and correction of programs introduced and stored therein.

An improved programmable calculator has been proposed by the applicant of this application as fully disclosed in Japanese Patent Publication No. 103,342/1978, which has means for delivering verbal indications of stored programs step-by-step for checkup of the stored programs. With the conventional programmable calculator having a display for providing sequentially a visual indication of stored programs, it is time- and labor-consuming for the operator to check step-by-step, the stored programs while looking alternately at the visual indications and his drawn program sheets. The programmable calculator as disclosed in the above-referenced publication, on the other hand, allows the operator to audibly confirm the contents of the introduced programs, thus eliminating the need to look alternately at visual indications and his program sheet. This enables the operator only to look at his program sheet and thus increases the ease by which the stored programs are checked.

OBJECTS AND SUMMARY OF THE INVENTION

It is an object of the present invention to provide a further improvement in the above described type of programmable calculators which provides a visual indication of the location of an error in the stored programs to allow easy and prompt correction for the error. More specifically, the gist of the present invention lies in the provision of a display means capable of displaying the contents of a plurality of consecutive program steps in a program memory at the same time and adapted for displaying the plurality of the consecutive program steps in a stepwise manner and means for sequentially providing verbal indications of the contents of the consecutive program steps being visually displayed.

With such an arrangement, it becomes possible to check a program just introduced by virtue of a verbal indication of the program derived from the verbal indication means and, in the event that an error has been found, immediately stop programming and correct the error readily and quickly, since the visual display means simultaneously provides a series of consecutive program steps to assist the operator in finding where the error is present in the program during the learning mode or thereafter.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE PREFERRED EMBODIMENT

Figure 1:
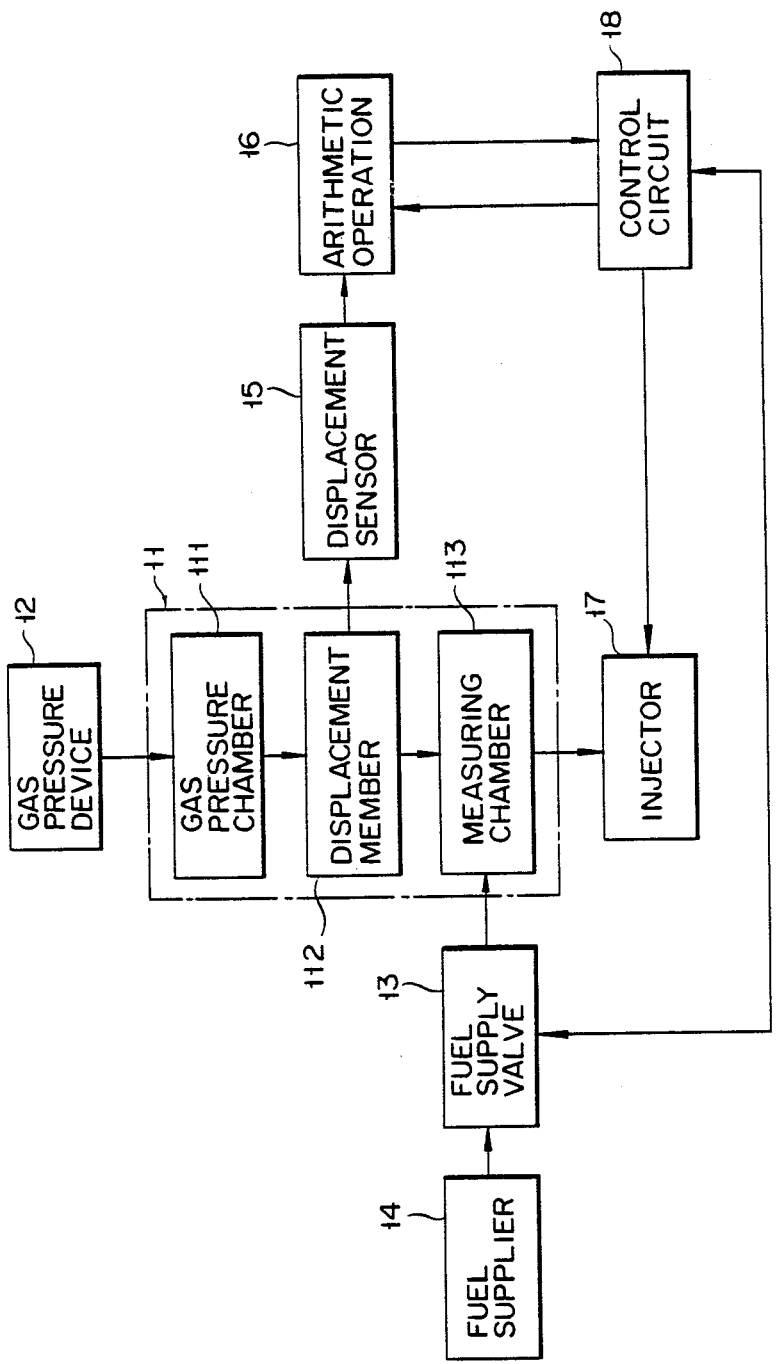
FIG. 1 is a schematic block diagram of a principal construction of one preferred form of the present invention.
Figure 2:
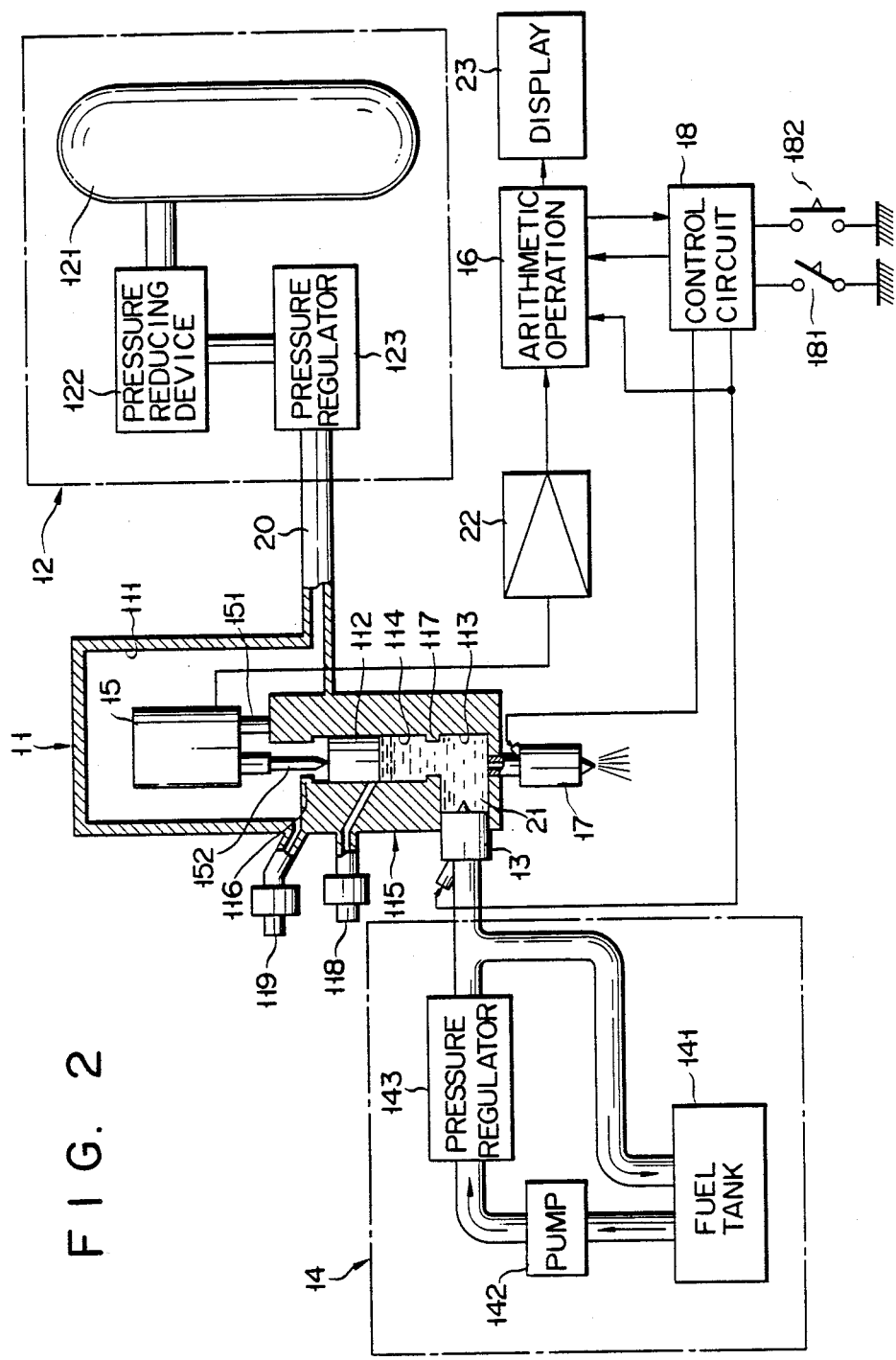
FIG. 2 is a perspective view of an output device in the illustrated embodiment.

Referring now to FIGS. 1 and 2, there is shown an embodiment of the present invention which includes a cathode ray tube (hereinafter called "CRT display") providing on its screen in succession visual displays of a plurality of consecutive steps in a program memory. In accordance with the present invention the contents of the program steps on the CRT display are also indicated in the form of synthesized sounds or voices. In FIG. 2, the CRT display is labeled CRT and a loud speaker for releasing sounds or voices is labeled SP. Of the visual indications on the CRT display, the extreme left number represents the program line number (a sort of program step numbers) and the right column represents the description of the respective lines of the program.

In the embodiment shown in FIG. 1, there are provided a keyboard KB, a program memory RM, an input control circuit IC for the program memory RM, an address counter PC which designates the address of the program memory RM, a countup circuit CP for the program counter PC, a reset circuit RPC for the program counter PC, a first standby register $SPC_1$ for storing the count in the program counter PC, a second standby register $SPC_2$ for the same purpose as above, a logic gate $G_2$ for governing transfer of information between PC and $SPC_1$ and a logic gate $G_3$ for gorerning transfer of information between PC and $SPC_2$. While a program is being introduced via the keyboard KB, the program counter PC is progressively incremented by operation of the countup circuit CP governed by actuation of a key on the keyboard KB. Upon actuation of a key on the keyboard KB an encoded signal is derived from the input control circuit IC and loaded into an address as defined by the count in the program counter PC. A line end code (E) in the count in the program memory RM indicates the partition of the respective lines and is established by actuation of a line end code input key which follows the completion of the loading of each line of a program. An instruction decoder IDC provides control signals in accordance with instruction codes MO sequentially fetched from the program memory RM. Except when in a checkup mode MC, the logic gate $G_1$ is in an operative state so that the control signals from the instruction decoder IDC are fed to a central processing unit CPU for execution of various arithmetic operations.

Figure 3:
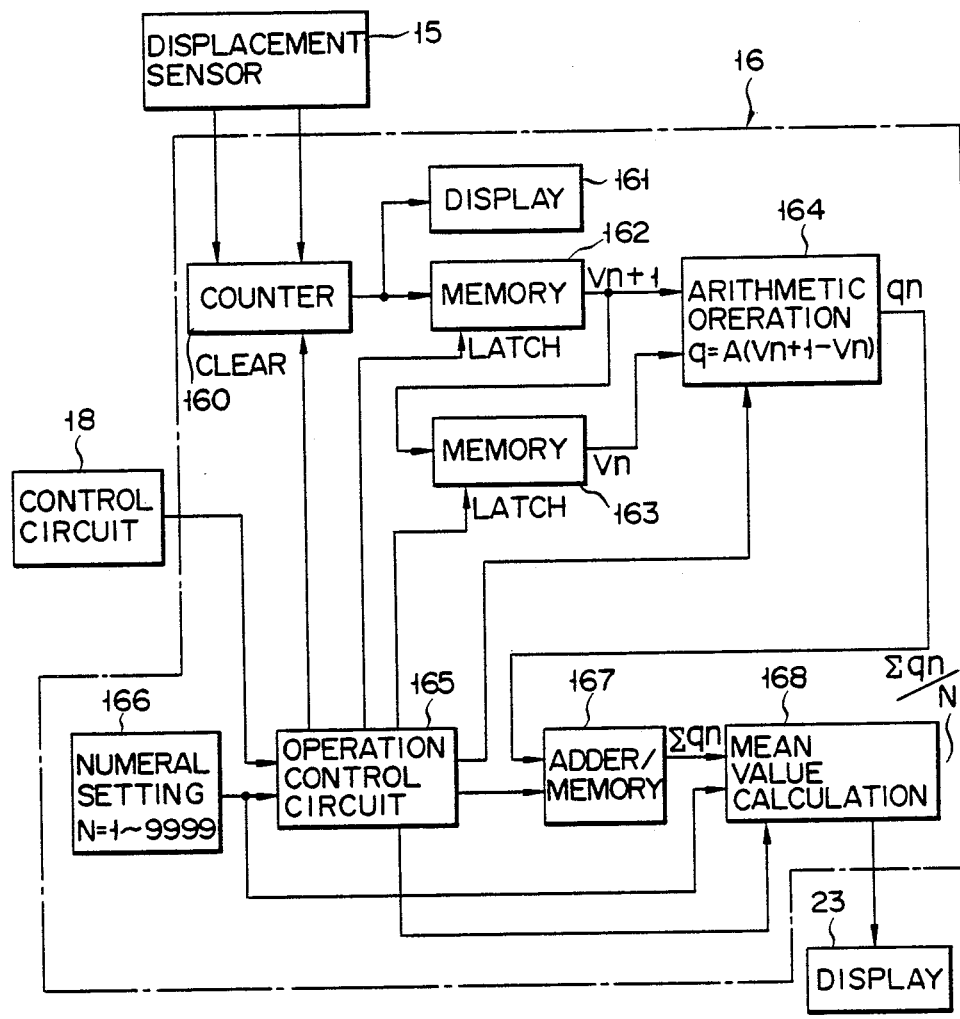
FIG. 3 is a flow chart for explanation of operation of the illustrated embodiment.

Operation of the above discussed system will be more fully understood from reference to a flow chart of FIG. 3 which shows routines to be executed during the program check mode, wherein $n_i$ (i=1, ... 14) denotes a respective one of the program steps.

If the calculator proceeds with the program checkup mode, steps $n_1$ and $n_2$ are achieved to reset the program counter PC and a program line counter CO which counts end signals (E) from the instruction decoder IDC in response to each line end code from the program memory RM. The calculator then proceeds with step $n_3$ wherein the instantaneous count in the program counter PC is transferred to the first standby register $SPC_1$, followed by step $n_4$ whereby the instantaneous count in the program counter CO is transferred to the standby register $CO_1$. A logic gate $G_4$ controls transfer of information between CO and $CO_1$.

A display information storage section DM temporarily stores program information of a length up to the full size of the screen of the CRT display. A display control circuit CC outputs display intelligences to the CRT display in accordance with the contents of DM. An input control circuit IM operatively associated with DM provides control in loading consecutive instruction codes from the program memory RM into a specific location of the storage section DM. The count (line number) in the program line counter CO is also loaded and stored in an appropriate location in DM through IM. Upon the completion of information of a length corresponding to the full size of the screen the control circuit IM develops a write completion signal $D_E$.

At steps $n_5$ and $n_6$ the program counter PC is incremented until the development of the signal $D_E$. As mentioned previously, the instruction codes from the program memory RM are loaded in succession into appropriate locations in DM via IM at the moment. Further, the program line number is loaded into an appropriate location in DM via IM. The contents of DM are visually displayed on the screen of the CRT display via CC as viewed in FIG. 2.

Upon the development of the write completion signal $D_E$ step $n_7$ is reached wherein the contents of PC are fed to the second standby register $SPC_2$. The following step $N_8$ returns the contents available in $SPC_1$ back to CO. Under these circumstances the calculator is made ready to provide verbal indications of the same program contents as on the screen of the CRT display sequentially begining with its leading step.

SM is a solid state memory (a semiconductor ROM) storing a large number of pieces of phoneme information (digital information) for speech or voice synthesis. A speech synthesis control circuit SC develop sound signals through appropriate combinations of the phoneme information contained in SM in order to provide verbal indications of words corresponding to the instruction codes fetched from the program memory RM and includes a built-in digital-to-analog converter, with the output of SM exciting the loud speaker SP to deliver verbal indications in synthesized voices. IS is a circuit which decodes the instruction codes from RM, searches what word to announce in synthesized voices and instructs SC of the results therof. Upon completion of a verbal indication of a specific word, SC produces a verbal output completion signal $S_E$.

Since the signal $D_E$ from IM turns on a logic gate $G_5$, the succeeding instruction codes from the program memory RM are fed to IS. $n_{10}$, $n_{11}$ and $n_{12}$ are effective in incrementing PC each time the signal $S_E$ is developed until the count in PC is in agreement with that in $SPC_2$. Accordingly, the contents of the program now on the screen of the CRT display are sequentially audibly indicated. If the line end code is developed during the course of the delivery of audible indications, then CO will be incremented by "1" based upon the end signal Ⓔ from IDC and IS prompts SC to deliver verbal indications of the contents (line number) of CO. However, no verbal indication is provided in response to the line end code supplied from RM to IS. In the present example, a verbal indication "line" procedes the delivery of a verbal indication of the line number, that is, the contents of CO. In other words, IS instructs the speech synthesis control circuit SC to provide first a verbal message of "line" and then verbal indications of the contents of CO (line number). Table 1 shows a typical way to pronounce the program messages.

TABLE 1

| Instruction | Sound Output |
| --- | --- |
| 000 | line zero zero zero |
| IN | in |
| " | quotation |
| # | number |
| = | equal |
| " | quotation |
| B | B |
| , | comma |
| " | quotation |
| D | D |
| A | A |
| T | T |
| A | A |
| = | equal |
| " | quotation |
| C | C |
| 001 | line zero zero one |
| FIX | fix |
| . | period |
| 9 | nine |
| 002 | line zero zero two |

If "$PC=SPC_2$" is determined at step $n_{12}$, then the calculator proceeds with step $n_{13}$ which increments PC by "one". $n_{14}$ is a step which decides whether the entire program stored in the program memory RM has been completely fetched and this can be accomplished as by sensing if the program end code (EC) at the very end of the program has been fetched from the program memory RM. A program end code detector JEC of FIG. 1 answers this question.

If the answer is "YES" at step $n_{14}$, the program checkup is finished and if "NO" step $n_3$ is restored to display visually and audibly the remaining portion of the program which has not yet appeared on the CRT display, the remaining portion of the program being required to be shorter than or equal to the full size of the CRT screen. Whether the program end code is displayed on the screen is immaterial.

As noted earlier, the illustrated embodiment not only displays the contents of the program memory RM frame by frame on the CRT screen but also provides, sequentially, verbal indications of each line of the stored program in that frame. The embodiment is further adapted such that alphabetical characters interposed between the quotation marks are encoded into character codes and loaded into the program memory RM and ultimately outputted in the form of audible voices, on a character-by-character basis. Those which are not interposed between the opposed quotation marks are regarded as a word in loading and announcing those characters. For instance, even if keys "I" and "N" are actuated as in learning steps such as "IN" and "FIX" in FIG. 2, word codes indicative of "IN" are stored in the form of a word. Therefore, IS directs SC to announce words "in" and "fix" when receiving the word codes indicative of "IN" and "FIX". On the other hand, when receiving the character codes, SC is prompted to provide verbal indications of those character codes.

Should only the step of the program being verbally announced blink on the CRT screen, it becomes more easy and convenient to recognize that step on the CRT screen.

Although in the above embodiment the contents of the program is first displayed on the CRT screen and then verbally announced in succession beginning with the leading step, the program can be both visually and verbally indicated at the same time as depicted in Table 2.

TABLE 2

| Display | Sound Output |
| --- | --- |
| 000: | line zero zero zero |
| 000: IN | in |
| 000: IN" | quotation |
| 000: IN"# | number |
| 000: IN"# = | equal |

Wheras the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A programmable calculator comprising:
    keyboard means for inputting a program having a plurality of lines of data into said calculator in a line-by-line format;
    memory means in said calculator for storing said program input by said keyboard in said line-by-line format;
    display means for simultaneously providing a visual display of a selected plurality of lines of said program in said line-by-line format input by said keyboard and stored in said memory; and
    sound output means for sequentially providing verbal indications of individual ones of said selected plurality of lines being visually displayed by said display means.

2. A programmable calculator as set forth in claim 1 wherein said display means comprises a cathode ray tube and said sound output means comprises a speech synthesizer.

3. A programmable calculator as set forth in claim 1 wherein said sound output means comprises a solid state memory storing a number of pieces of phoneme information, a speech synthesizer for extracting and combining selected ones of said pieces of the phoneme information for establishment of synthesized sound waveforms and a loud speaker.

* * * * *